W. W. LUNGER.
Nut-Lock.
No. 203,169. Patented April 30, 1878.
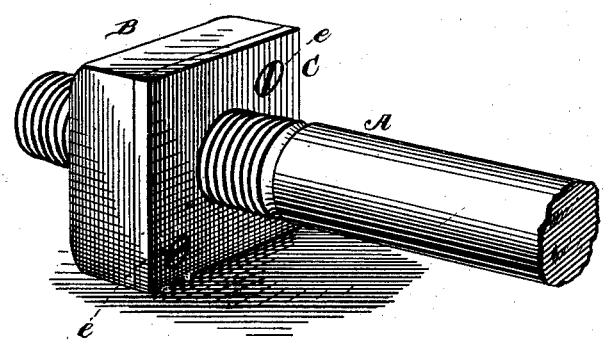
Fig. 1.
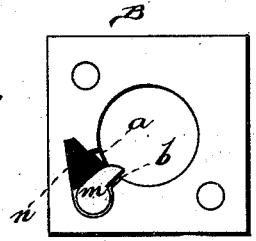
Fig. 2.
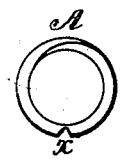
Fig. 3.
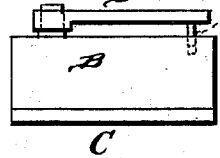
Fig. 4.
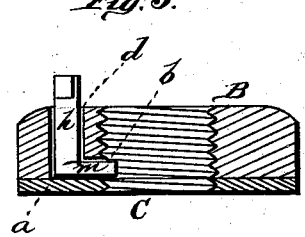
Fig. 5.
Fig. 6.
WITNESSES
Robert Everett
James J. Sheehy
INVENTOR
Wm W. Lunger
Gilmore Smith & Co.
ATTORNEYS

UNITED STATES PATENT OFFICE.

WILLIAM W. LUNGER, OF ANAMOSA, IOWA.

IMPROVEMENT IN NUT-LOCKS.

Specification forming part of Letters Patent No. 203,169, dated April 30, 1878; application filed March 16, 1878.

*To all whom it may concern:*

Be it known that I, WILLIAM W. LUNGER, of Anamosa, in the county of Jones and State of Iowa, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of a bolt and nut fastened by my nut-lock. Fig. 2 is a plan view of the nut. Fig. 3 is a plan view of the bolt. Fig. 4 is a side view of the nut. Fig. 5 is a vertical sectional view; and Fig. 6 is a plan view of the nut.

My invention relates to devices for locking nuts and bolts; and it consists in a pawl arranged with a spring behind it in a recess in the nut, and covered with a plate, said pawl taking into the threads of the bolt, to prevent the nut turning backward, as will be hereinafter more fully set forth.

The annexed drawing, to which reference is made, fully illustrates my invention.

A represents an ordinary threaded bolt, and B is the nut screwed thereon. In the inner side of this nut is formed a recess, $a$, opening at $b$ into the central tapped bolt-hole. A hole, $d$, is made in this recess entirely through the nut. Through the hole $d$ is passed a rod or short shaft, $h$, which is at its inner end in the recess $a$ formed or provided with a pawl, $m$, behind which is placed a spring, $n$, so arranged as to throw the pawl inward, and cause its point to project through the opening $b$, and engage in the threads of the bolt in such a manner that the nut can be screwed up on the bolt, but cannot turn backward. The pawl and spring are concealed by a plate, C, of the same size as the nut, and fastened thereto by countersunk screws $e$ $e$, said plate forming, as it were, a part of the nut, and cannot be removed or come loose when the nut is screwed up.

By this construction no openings are presented through which dirt, &c., might enter and clog the operation of the pawl.

If desired, a longitudinal groove, $x$, may be made in the threaded portion of the bolt, for the pawl $m$ to engage in, but the pawl will, in practice, engage with any part of the threads.

The shaft $h$ projects beyond the outer face of the nut, and its end is made square or oblong, to receive a corresponding eye made in one end of an arm, D, for the purpose of turning the pawl $m$ out of the way, so that the nut can be turned backward on the bolt.

The arm D is, near its outer end on the under side, provided with a pin, $p$, which is to enter in a notch or recess, $s$, in the outer face of the nut, for holding back the pawl.

What I claim as new, and desire to secure by Letters Patent, is—

1. In a nut-locking device, a nut the inner side of which is formed with a recess, $a$, opening at $b$ into the tapped bolt-hole, and a hole, $d$, passing entirely through the nut, in combination with the shaft $h$, its inner end being provided with a spring-pawl, $m$, and resting within the recess $a$, and a covering-plate, C, the whole so arranged as to present no opening through which dirt, &c., might enter and clog the pawl, substantially as shown and described.

2. In combination with the bolt A, nut B, pawl $m$, and shaft $h$, the arm D, with pin $p$, and the recess $s$ in the face of the nut, substantially as and for the purposes set forth.

In testimony that I claim the above I have hereunto subscribed my name in the presence of two witnesses.

WM. W. LUNGER.

Witnesses:
LEVI B. PEET,
WM. H. PEARSON.